United States Patent [19]

Kimura et al.

[11] Patent Number: 5,790,333
[45] Date of Patent: Aug. 4, 1998

[54] DISK DRIVE HAVING OPTIMIZED OFF-TRACK COMPENSATION

[75] Inventors: Toshiki Kimura, Kawasaki; Masayoshi Ishii, Higashine, both of Japan

[73] Assignee: Fujitsu Limited, Kawasaki, Japan

[21] Appl. No.: 593,822

[22] Filed: Jan. 30, 1996

[30] Foreign Application Priority Data

Apr. 21, 1995 [JP] Japan ................ 7-096821

[51] Int. Cl.⁶ .................................. G11B 19/04
[52] U.S. Cl. .......................... 360/60; 360/77.04
[58] Field of Search ................ 360/77.04, 60, 360/53, 31

[56] References Cited

U.S. PATENT DOCUMENTS

| | | | |
|---|---|---|---|
| 4,814,909 | 3/1989 | Brown et al. | 360/77.04 X |
| 5,109,502 | 4/1992 | Sasamoto et al. | 360/77.04 X |
| 5,233,487 | 8/1993 | Christensen et al. | 360/77.04 |
| 5,500,776 | 3/1996 | Smith | 360/77.04 |

FOREIGN PATENT DOCUMENTS

| | | |
|---|---|---|
| 62-165219 | 7/1987 | Japan. |
| 1-296470 | 11/1989 | Japan. |
| 5-101520 | 4/1993 | Japan. |
| 5-99681 | 4/1993 | Japan. |
| 5-282638 | 10/1993 | Japan. |

*Primary Examiner*—Aristotelis M. Psitos
*Assistant Examiner*—James L. Habermehl
*Attorney, Agent, or Firm*—Greer, Burns & Crain, Ltd.

[57] ABSTRACT

A method for optimizing a write offset margin includes the steps of writing test data on a recording medium along a track defined thereon by a head, reading the test data from the recording medium by the head while changing an offset of the head with respect to the track, determining a maximum offset that provides agreement between the test data written into the recording medium along the track by the head and the test data read out from the recording medium by the head along the track, and setting a write offset margin for the magnetic disk based upon the maximum offset.

22 Claims, 7 Drawing Sheets

FIG. I

DISK DRIVE HAVING OPTIMIZED OFF-TRACK COMPENSATION

BACKGROUND OF THE INVENTION

The present invention generally relates to disk drives and more particularly to a disk drive having an optimized write offset margin.

With the increasing size of recent computer systems, there is a persistent demand for increased storage capacity of magnetic disk drives. Such magnetic disk drives of large storage capacity are required to be capable of recording and reproducing information to and from a magnetic disk with high recording density.

In order to achieve the desired high density recording and playback of information, conventional magnetic disk drives employ a tracking control of a magnetic head such that the magnetic head closely follows a concentric or spiral track or cylinder defined on a magnetic disk. It should be noted that a magnetic disk stores information thereon along such tracks.

In order to guarantee a normal playback of information even when the magnetic head is offset slightly from a nominal track position at the time of writing, a magnetic head is usually designed to have an off-track tolerance known as "write offset margin" or "write off-track slice." A normal playback of information is guaranteed as long as the writing of information is made within such a write offset margin of the magnetic head. In other words, a magnetic disk drive controls the magnetic head thereof at the time of writing so that the off-track of the magnetic head falls within the write offset margin.

When a magnetic head is off-track a distance exceeding the write offset margin at the time of writing, as in the case of shifting the disk drive when writing information by a magnetic head, no proper reading of information is guaranteed anymore for the information that has been recorded by such an off-track head. Further, there is a substantial risk that such an off-track head destroys the magnetic recording that has already been made upon the magnetic disk, by overwriting an adjacent track.

The accuracy of magnetic head control itself is determined by the performance of a tracking control circuit used for controlling the tracking of the magnetic head and the precision of a head drive mechanism. No problem arises as long as the accuracy of the magnetic head control exceeds the write offset margin at the time of writing.

In such conventional magnetic disk drives, it should be noted that the write offset margin has been set to a predetermined value irrespective of individual magnetic heads having respective, slightly different characteristics, or irrespective of the tracks. It should be noted that the relative speed of the magnetic head with respect to the magnetic disk changes depending upon the track on the magnetic disk. Under such circumstances and situations, it has been practiced in the conventional magnetic disk drives to set the write offset margin of the disk drive in accordance with the magnetic head that has the smallest off-track tolerance, even when other magnetic heads may have larger write offset margins.

As long as the magnetic head is controlled with satisfactorily high precision comparable to the write offset margin defined for the magnetic heads, no problem arises. However, such a high precision control of magnetic head position becomes increasingly difficult with decreasing track pitch on the magnetic disk and hence with decreasing write offset margin, due to limitations in mechanical precision. When the write offset margin is small, a very high precision control is required for the magnetic head position at the time of writing. Further, there frequently occurs necessity for retrial for writing data as well as reading data to and from the magnetic disk.

Thus, there is a substantial risk that the magnetic head may offset beyond the write offset margin at the time of writing in such high density magnetic disk drives. In order to guarantee a normal, defect-free reading of information thus recorded on the magnetic disk, it is often necessary to carry out one or more retrials of writing, while such retrials inevitably increases the time of writing information into the magnetic disk.

Further, conventional high density magnetic disk drives, in which the magnetic head tends to scan the magnetic disk at the edge of the narrow write offset margin, may have a difficulty even at the time of normal reading of information by a properly positioned, on-track magnetic head, due to the variation of the magnetic head characteristics, or due to the change of the relative speed of the magnetic head with respect to the magnetic disk, as long as the write offset margin is set uniformly throughout the magnetic heads in the disk drive or throughout the tracks on the magnetic disk. It should be noted that the former problem arises due to the fabrication process of the magnetic head, while the latter problem arises as a result of scanning of the magnetic head over different tracks having different diameters. When retrials are made frequently not only at the time of writing but also at the time of reading, the access time of the magnetic disk drive increases accordingly, even when a proper recording of information is made on the magnetic disk.

SUMMARY OF THE INVENTION

Accordingly, it is a general object of the present invention to provide a magnetic disk drive wherein the foregoing problems are eliminated.

Another and more specific object of the present invention is to provide a disk drive capable of setting optimum write offset margins for each of heads in the disk drive by an automatic process.

Another object of the present invention is to provide a disk drive, comprising:

a disk, defined with a track for storing information signals therealong;

a drive motor for driving said disk;

a head supplied with an information signal for recording and/or reproducing said information signal to and from said disk along said track;

a head drive mechanism for carrying thereon said head, said head drive mechanism causing said head to scan said disk along said track thereon;

a head drive controller for controlling said head drive mechanism such that said head scans said disk along said track on said disk within a predetermined maximum off-track;

a recording circuit for supplying test data to said head as an information signal for causing said head to record said test data on said disk along said track;

a memory for storing said test data;

a reproducing circuit for processing an information signal reproduced from said track on said disk by said head;

an evaluation circuit supplied with said test data from said memory and further with said reproduced information signal from said reproducing circuit, for evaluating a maximum off-track for said head, said maximum off-track being defined as a maximum allowable off-track of said head in which an agreement is achieved between said test data and said reproduced information signal, said evaluation circuit supplying said maximum off-track to said head drive controller as said predetermined maximum off-track; and a setup unit for writing a write offset margin into said memory based upon said maximum off-track.

Another object of the present invention is to provide a method for optimizing a write offset margin for each of heads of a disk drive, comprising the steps of:

writing test data on a recording medium along a track defined thereon by a head;

reading said test data from said recording medium by said head, while changing an offset of said head with respect to said track;

determining a maximum offset that provides agreement between said test data written into said recording medium along said track by said head and said test data read out from said recording medium by said head along said track; and setting a write offset margin for said magnetic disk based upon said maximum offset.

Another object of the present invention is to provide a write offset setup circuit for use in a disk drive that includes a recording disk, comprising:

a memory for storing test data;

a write circuit for writing said test data into said recording disk by a head along a track defined on said recording disk;

a reproducing circuit for processing said test data that has been read out from said disk by said head to produce reproduced test data;

an evaluation circuit supplied with said test data from said memory and further with said reproduced test data from reproducing circuit for evaluating a maximum off-track of said head with respect to said track, said maximum off-track being defined as a maximum allowable off-track of said head with respect to said track in which an agreement is maintained between said test data and said reproduced test data, said evaluation circuit supplying said maximum off-track to said head drive controller as said predetermined maximum off-track; and a setup unit for writing said write offset margin into said memory based upon said maximum off-track.

According to the present invention, the write offset margin is defined for each of the magnetic heads as the maximum allowable off-track, in accordance with the head characteristics of the respective heads. Further, the write offset margin of a magnetic head can be set dynamically for each of the tracks. Thereby, the problems associated with the narrow write offset margin, such as excessive retrials of writing and or reading, are successfully eliminated.

Other objects and further features of the present invention will become apparent from the following detailed description when read in conjunction with the attached drawings.

DETAILED DESCRIPTION OF THE PREFERRED EMBODIMENTS

Figure 1:
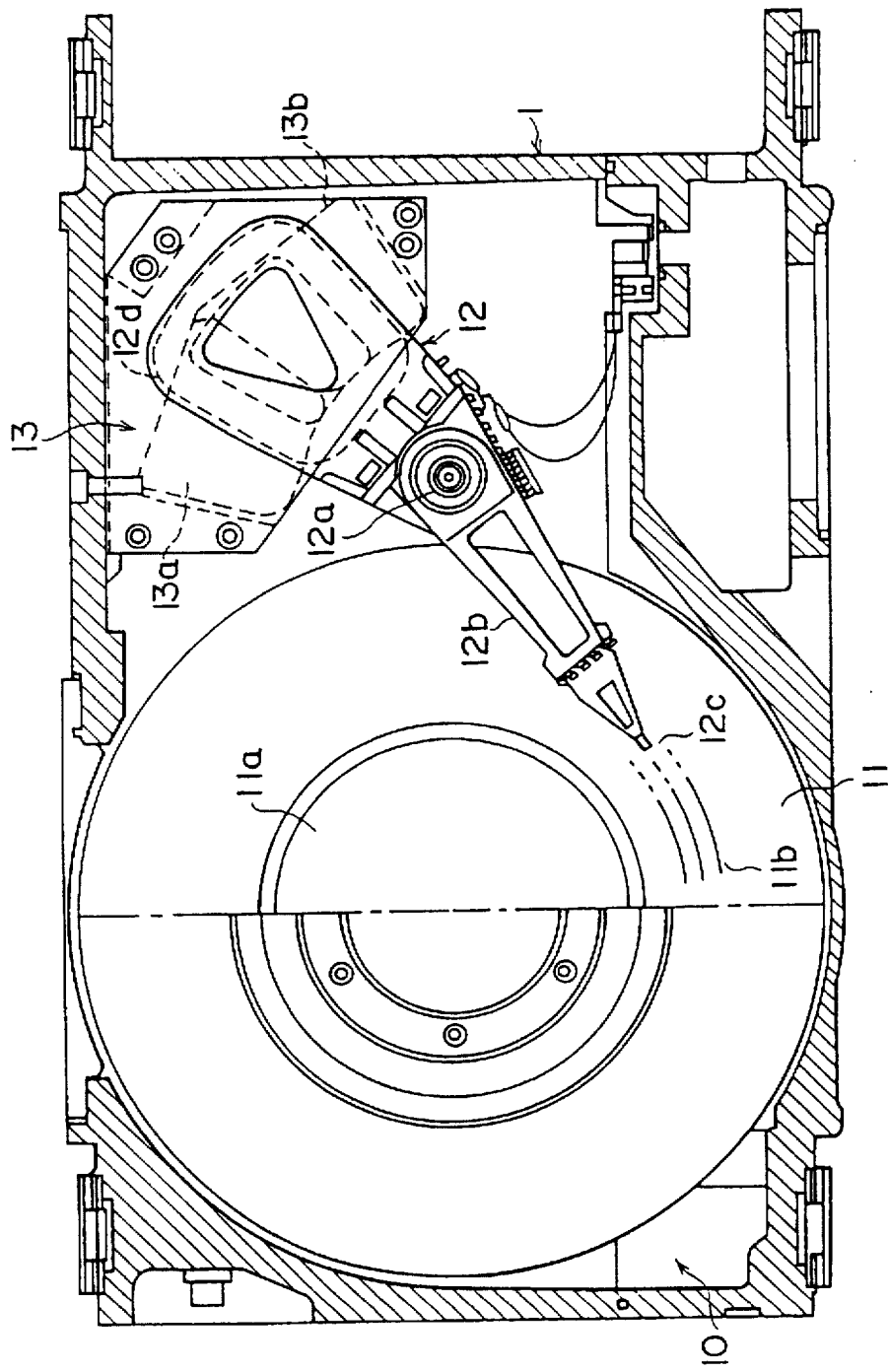
FIG. 1 is a diagram showing the construction of a magnetic disc drive according to a first embodiment of the present invention in a plan view.

FIG. 1 shows the internal structure of a magnetic disk drive disk according to a first embodiment in a plan view, wherein the magnetic disk drive is a so-called hard disk drive including a number of magnetic disks and corresponding magnetic heads. In FIG. 1, the left side of a broken line shows the hard disk drive in a state wherein the upper cover is removed, while the right side of the broken line shows the construction of a magnetic disk 11 and an arm assembly 12 that cooperates with the disk 11, wherein the magnetic disk 11 and the arm assembly 12 forms a part of a magnetic disk assembly 10 in which a plurality of magnetic disks are stacked with each other.

Referring to FIG. 1, each magnetic disk 11 is mounted upon a hub 11a that is driven by a motor not illustrated, and the arm assembly 12 includes a swing arm 12b held on a swing axle 12a and a magnetic head 12c provided on a free end of the arm 12b. Further, a coil 12d that forms a part of a voice coil motor 13 is provided on the arm 12b in correspondence to another free end, opposite to the first free end on which the magnetic head 12c is provided, wherein the coil 12d is wound parallel to the scanning surface of the arm 12b. Further, magnets 13a and 13b forming another part of the voice coil motor 13 are disposed above and below the coil 12d. Thereby, the arm 12 is rotated about the swing axle 12a freely in response to the energization of the coil 12d. The voice coil motor 13 is subjected to a servo control such that the magnetic head 12c carried on the arm 12b properly traces a track 11b that is defined on the magnetic disk 11.

Figure 2:
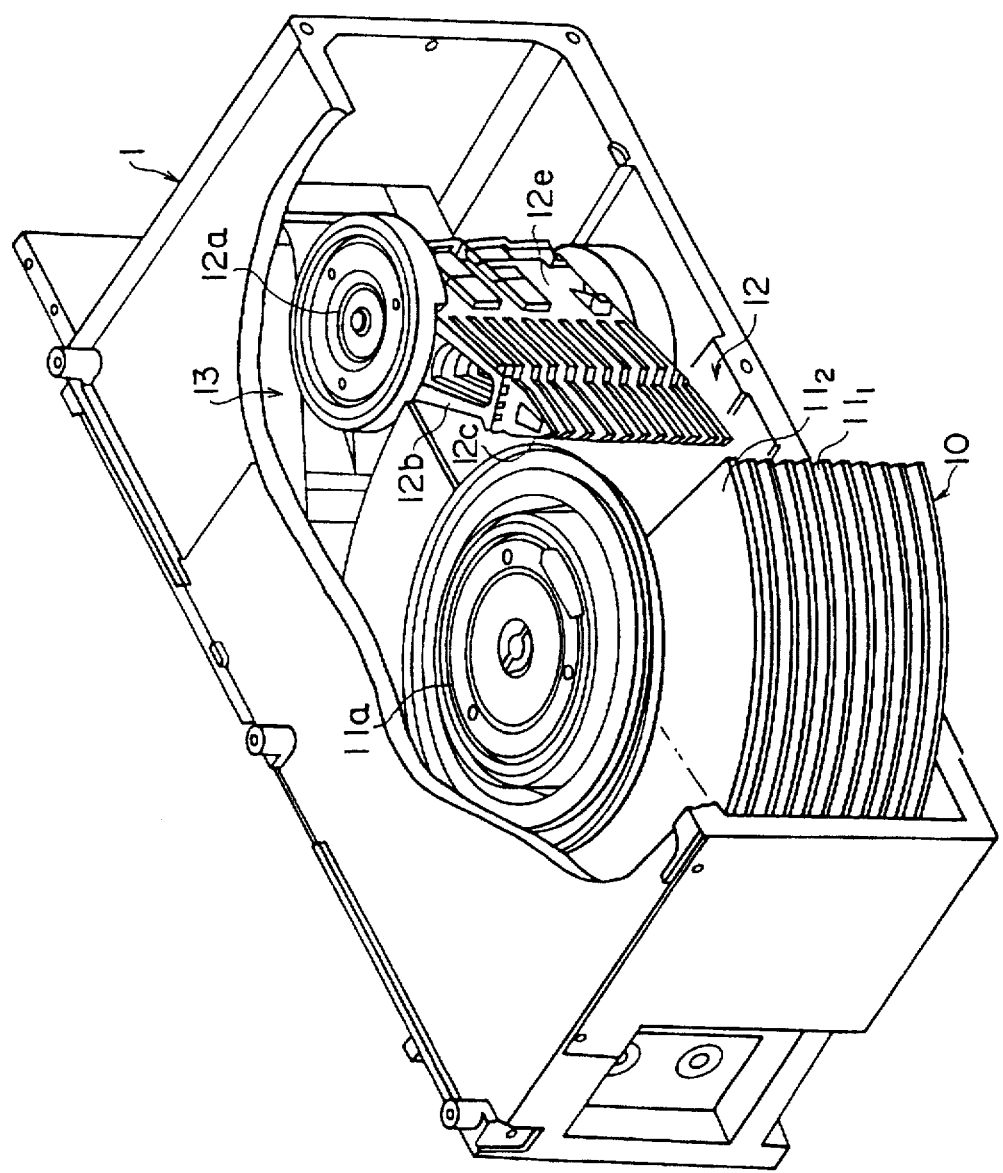
FIG. 2 is a diagram showing the construction of the magnetic disk drive of FIG. 1 in a perspective view with a part thereof removed.

FIG. 2 is a perspective view showing the internal structure of the hard disk drive of FIG. 1.

Referring to FIG. 2, the magnetic disk assembly 10 includes a plurality of magnetic disks $11_1$, $11_2$, . . . that are held commonly on the rotary hub 11a, and the arm assembly 12 includes a plurality of arms corresponding to the plurality of magnetic disks. Each arm 12b is held on a common rotatable member 12e that in turn is held rotatable about the swing axle 12a, and all the arms 12b are swung simultaneously in response to the rotational motion of the member 12e. Of course, the member 12e is activated in response to the energization of the voice coil motor 13. Further, the entire structure of the hard disk drive is accommodated within a hermetically sealed envelop 1.

In the hard disk drives having such a construction, one of the stacked magnetic disks such as the magnetic disk $11_1$ is recorded with a servo signal in the form of a magnetization pattern along a track 11b (FIG. 1) that is defined on the magnetic disk. By controlling the magnetic head that cooperates with the magnetic disk $11_1$ to track the foregoing servo signal, other magnetic heads also trace the tracks on the respective, corresponding magnetic disks.

Figure 3:
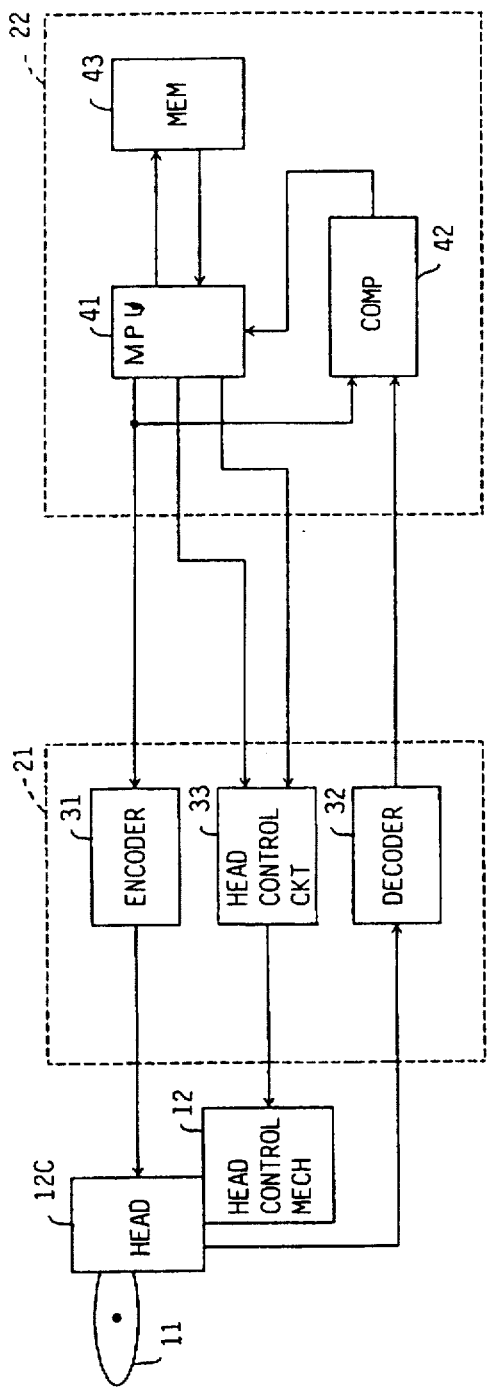
FIG. 3 is a block diagram showing the construction of a circuit used in the magnetic disk drive of FIG. 1 for setting up a write offset margin.

FIG. 3 shows the construction of a signal processing circuit used in the hard disk drive of the first embodiment for setting up the write offset margin.

Referring to FIG. 3, the signal processing circuit is primarily formed of a head drive circuit 21 and a controller circuit 22, wherein the head drive circuit 21 includes an encoder 31 and a decoder 32 respectively for encoding data to be written into the magnetic disk 11 via the magnetic head 12c and for decoding data that has been read out from the magnetic disk 11 by the magnetic head 12c. Further, the head drive circuit 21 includes a head position controller 33 that controls the position of the magnetic head 12c by controlling the voice coil motor 13.

The controller circuit 22 includes a microprocessor (MPU) 21, a data comparator 22 and a memory 23, and carries out the measurement of the off-track tolerance for each of the magnetic heads 12c as well as the setting up of the write offset margin of the magnetic head 12c based upon the off-track tolerance thus measured.

More specifically, the memory 43 stores test data for measurement of the write offset margin, and the MPU 41 reads out the test data thus stored in the memory 43. The test data thus read out is supplied to the magnetic head 12c via the encoder 31 after encoding therein. Simultaneously, the MPU 41 issues a command to the head position controller 33 for causing an offset in the position of the magnetic head 12c with respect to the nominal track on the magnetic disk 11, such that the offset changes gradually and consecutively.

The test data thus written into the magnetic disk 11 is then reproduced by the magnetic head 12c and is supplied to the data comparator 42 via the decoder 32, wherein the data comparator 42 compares the reproduced test data with the test data that has been written into the magnetic disk. The data comparator 42 supplies the result of comparison thus carried out to the MPU 41, and the MPU 41 increases the offset gradually, until the data comparator 42 detects an agreement (or disagreement) between the reproduced test data and the written test data. Thereby, the MPU 41 determines the write offset margin for the magnetic disk 12c based upon the largest off-track tolerance thus determined at the time of writing.

The write offset margin thus determined is stored in the memory 23. Further, the MPU 41 supplies the write offset margin to the head position controller 33, and the head position controller 33 controls the head position within the write offset margin thus obtained.

In FIG. 3, it should be noted that only one magnetic head 12c is illustrated for the sake of simplicity. However, the magnetic disk drive may include the magnetic head 12c with plural numbers as already noted with reference to FIG. 2.

Hereinafter, the step-by-step operation of the circuit of FIG. 3 will be described in detail with reference to the flowchart of FIG. 4.

Referring to FIG. 2, the MPU 41 of the control circuit 22 reads out the test data stored in the memory 43 in a step S1 and sets the same in a register provided in the data comparator 42. Further, the MPU 41 supplies the test data to the encoder 31 of the head drive circuit 21.

Next, in a step S2, the MPU 41 selects a magnetic head 12c and specifies a track 11b on the magnetic disk 11. Further, the MPU 41 issues a command to the encoder 31 for causing a writing of the test data into the selected track 1ib on the disk 11 by the selected magnetic head 12c, without an off-track. In response thereto, the encoder 31 encodes the test data and writes the encoded test data on the disk 11 in a step S3 by the selected magnetic head 12c without off-track.

Next, in a step S4, the MPU 41 initializes a parameter n such that n=0, and a step S5 is carried out subsequently, wherein the MPU 41 sets an off-track of the head 12c to ($\alpha$−0.05×n) μm. The parameter a may be set to 3, for example. The off-track thus determined is supplied to the head position control circuit 33.

Further, in a step S6, the MPU 41 issues a command to the decoder 12 to read the test data after the completion of the foregoing offset by the head position control circuit 33, and the test data thus read out from the disk 11 by the magnetic head 12c and decoded by the decoder 32 is supplied to the data comparator 22 for comparison with the original test data.

Further, in a step S7, the data comparator 22 discriminates whether the reproduced test data thus obtained and the original test data agree or not. If the result of the discrimination is NO, a step S8 is carried out wherein the parameter n is increased by one and the process returns to the step S5. The amount of the off-track is reduced by 0.05 μm.

On the other hand, if the result of the step S7 is YES, a step S9 is carried out, wherein the write offset margin is determined by applying a predetermined coefficient to the off-track tolerance. For example, the write offset margin is determined according to the relationship write offset margin=off-track tolerance×0.9, and the write offset margin thus determined is stored in the memory 23.

It should be noted that the foregoing operation is achieved for each of the magnetic heads 12c and for each of the tracks 11b on the disk 11, and the memory 23 stores the write offset margin thus obtained for each of the magnetic heads 12c and for each of the tracks 11b. Thereby, the MPU 41 sets an optimum write offset margin in the head position control circuit 33 for each of the magnetic heads 12c and for each of the tracks 11b by referencing to the memory 23.

By doing so, the problems of excessively small write offset margin caused by the variation of the heads or by the change in the tracks are successfully eliminated. In other words, it is guaranteed that the write offset margin thus obtained is the maximum allowable off-track for the head that is scanning the track. As a result, the problems of excessive retries at the time of writing, as well as excessive retries at the time of reading, are eliminated, and the operational performance of the magnetic disk drive increases substantially.

In the foregoing embodiment, one may omit the data comparator 22. In this case, the memory 23 not only stores the test data to be written into the disk 11 but also the test data reproduced from the disk 11, and the MPU 41 carries out the comparison of the reproduced test data and the original test data in the step S7, in place of the data comparator 22.

It should be noted that the calculation of the write offset margin is not limited to the foregoing formula but other formula may also be employed. For example, one may use the value of the off-track tolerance detected in the step S7 as it is for the write offset margin. In this case, the write offset margin is given according to the formula write offset margin=off-track tolerance×1.

Next, a second embodiment of the present invention will be described with reference to FIG. 5.

Figure 5:
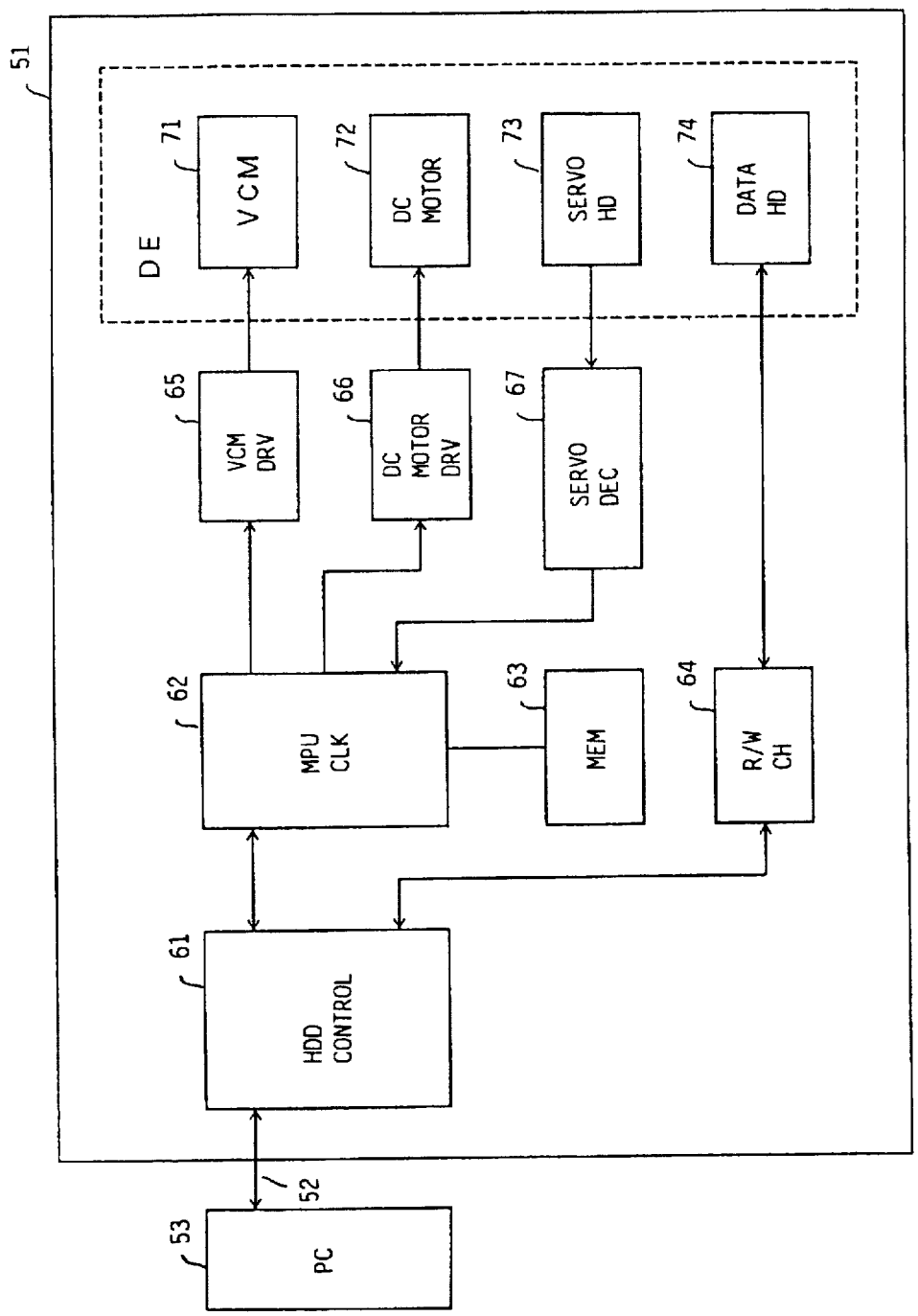
FIG. 5 is a block diagram showing the construction of a signal processing system of a magnetic disk drive according to a second embodiment of the present invention.

Referring to FIG. 5 showing a signal processing system 51 of a hard disk drive similar to the one shown in FIGS.1 and 2, the signal processing system 51 includes a hard disk controller 61 connected to a host device 53 such as a computer via an interface 52. The hard disk controller 61 controls a microprocessor (MPU) 62 corresponding to the MPU 41, wherein the MPU 62 controls a voice coil motor 71 corresponding to the voice coil motor 13 of FIG. 2 via a driver circuit 65 such that the arm assembly 12 and the magnetic heads 12c thereon scan a desired track 11b on the surface of the magnetic disks 11. The MPU 62 further controls a drive motor 72 that drives the magnetic disks 11 via a motor drive circuit 66, based upon a servo control signal obtained from one of the magnetic disks 11 by a servo head 73 and supplied to the MPU 62 via a servo decoder 67. Further, the hard disk controller 61 controls a data head 74 via a read/write channel 64 and carries out a writing and reading of information signals to and from the selected track 11b on a selected magnetic disk 11.

Further, the MPU 62 cooperates with a memory 63 that stores therein a write offset margin for each of the magnetic heads 74 corresponding to the magnetic heads 12c on the arm assembly 12 and for each of the tracks 11b on the magnetic disks 11. Thereby, the MPU 62 controls the position of the magnetic heads 12c within the respective write offset margins thus obtained, such that writing of data is aborted when the head position exceeds the write offset margin. In such a case, retrial of writing is made as usual.

Upon switching on of the magnetic disk drive 51, the MPU 62 reads out a program from the memory 63 and drives the d.c. motor 72 such that the magnetic disks 11 are revolved at a predetermined speed. Further, the MPU 62 controls the voice coil motor 71 via the driver circuit 65 based upon a predetermined initial setting, such that the servo head 73 and the data head 74 are moved to respective positions corresponding to a desired track 11b.

In response to the supply of a write command from the external device 53 via the interface 52, the hard disk controller 61 decomposes the write command thus supplied into corresponding internal commands of the magnetic disk drive 51 and supplies the same to the MPU 62. The MPU 62, in turn, moves the servo head 73 and the data head 74 to respective positions corresponding to the desired track 11b of the data head 74 by controlling the voice coil motor 71 via the driver circuit 65 in response to the internal commands thus supplied, wherein the MPU 62 controls the data head position such that the data head 74 is maintained within the write offset margin defined for the head 74 and defined for the selected track 11b, by referencing to the memory 63 that stores the write offset margin. When the head off-track exceeds the write offset margin, the MPU 62 aborts the writing and activates a retrial of writing.

When the data head 74 is positioned properly within the write offset margin, the MPU 62 issues a write command to the read/write channel 64 via the hard disk controller 61, and the read/write channel 64 encodes the write data to produce an information signal current corresponding thereto. The information signal current thus produced is then supplied to the data head 74, and in response thereto, the data is written into the selected track 11b on the magnetic disk 11.

When a read command is supplied from the external device 53 via the interface 52, the hard disk controller 41 decomposes the read command into corresponding internal commands and supplies the same to the MPU 62. The MPU 62, in turn, moves the servo head 73 and the data head 74 to respective positions corresponding to the desired on-track position of the data head 74, by controlling the voice coil motor 71 via the driver circuit 65 in response to the internal commands thus supplied.

It should be noted that the MPU 62 may control the data head position such that the data head 74 is maintained within the write offset margin defined for the selected head 74 and defined for the selected track 11b also at the time of reading, by referencing to the memory 63 that stores the write offset margin. In this case, retrial of reading is made when the head off-track exceeds the write offset margin.

The data head 74 thereby reproduces the information recorded on the selected track 11b and produces an output information signal, wherein the output information signal thus obtained is processed by the read/write channel 44 that decodes the information signal thus reproduced. The reproduced data obtained by the read/write channel 44 is then forwarded to the external device 33 via the interface 32.

Figure 6:
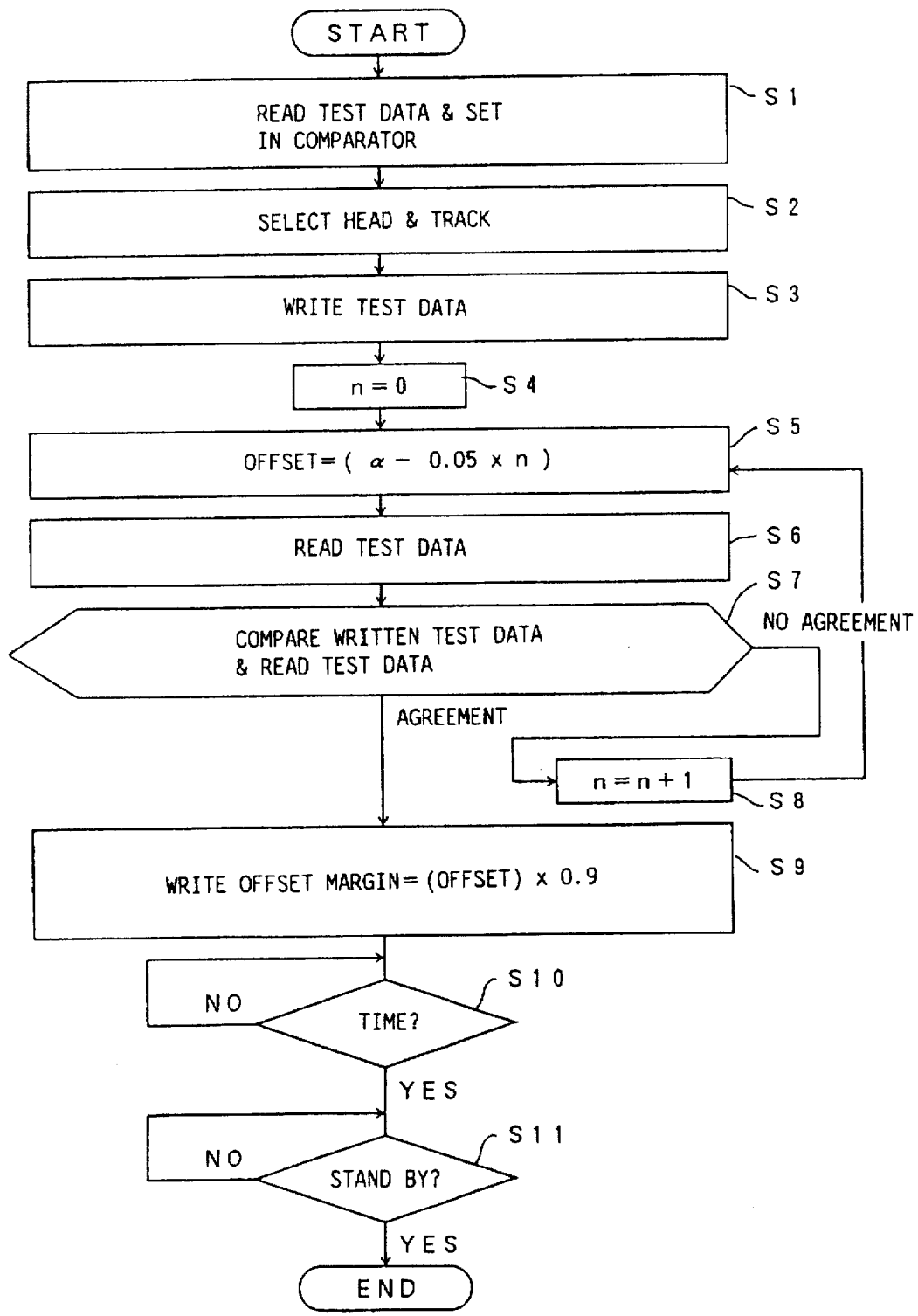
FIG. 6 is a flowchart showing the operation of the circuit of FIG. 5.

Next, the operation of the disk drive 51 for setting up the write offset margin will be described with reference to a flowchart of FIG. 6. In the operation of FIG. 6, it should be noted that the MPU 62 performs as the function of the MPU 41 and the data comparator 42 of FIG. 3, while the read/write channel 44 functions as both of the encoder 11 and the decoder 12. Further, the memory 63 corresponds to the memory 43.

It should be noted that the setting up of the write offset margin, including the measurement of the off-track tolerance for each of the magnetic heads and determination and storage of the write offset margin, may be achieved anytime during the operation of the disk drive 51 such as the starting up of the disk drive. Alternatively, one may achieve the foregoing setting up of the write offset margin periodically with a regular interval, by counting up the time by a timer of the MPU 62. For this purpose, the MPU 62 may employ a clock provided therein. When carrying out the setting up of the write offset margin after the operation of the disk drive has started, it is preferable to achieve the setting up during a stand-by interval in which the disk drive 31 is not carrying out normal reading or writing.

Referring to FIG. 6, the process includes the steps S1–S9 described previously with reference to the flowchart of FIG. 4. After the step S9, a step S10 is conducted wherein it is decided whether the time has exceeded a predetermined interval, based upon the timer of the MPU 62. If a predetermined interval has elapsed and the result of the step S10 has become YES, a step S11 is conducted and a discrimination is made whether or not the disk drive 51 is idling without carrying out reading or writing.

If the result of the step S1 is NO, the process returns to the step S1 and the step S11 is repeated until the disk drive 51 starts idling. On the other hand, if the result of the step S11 is YES, the process returns to the step Si, and the measurement of the off-track tolerance and the setting up of the write offset margin is carried out.

Thus, according to the process of FIG. 6, the write offset margin is updated periodically while avoiding the duration in which the magnetic disk drive is carrying out reading or writing.

Figure 4:
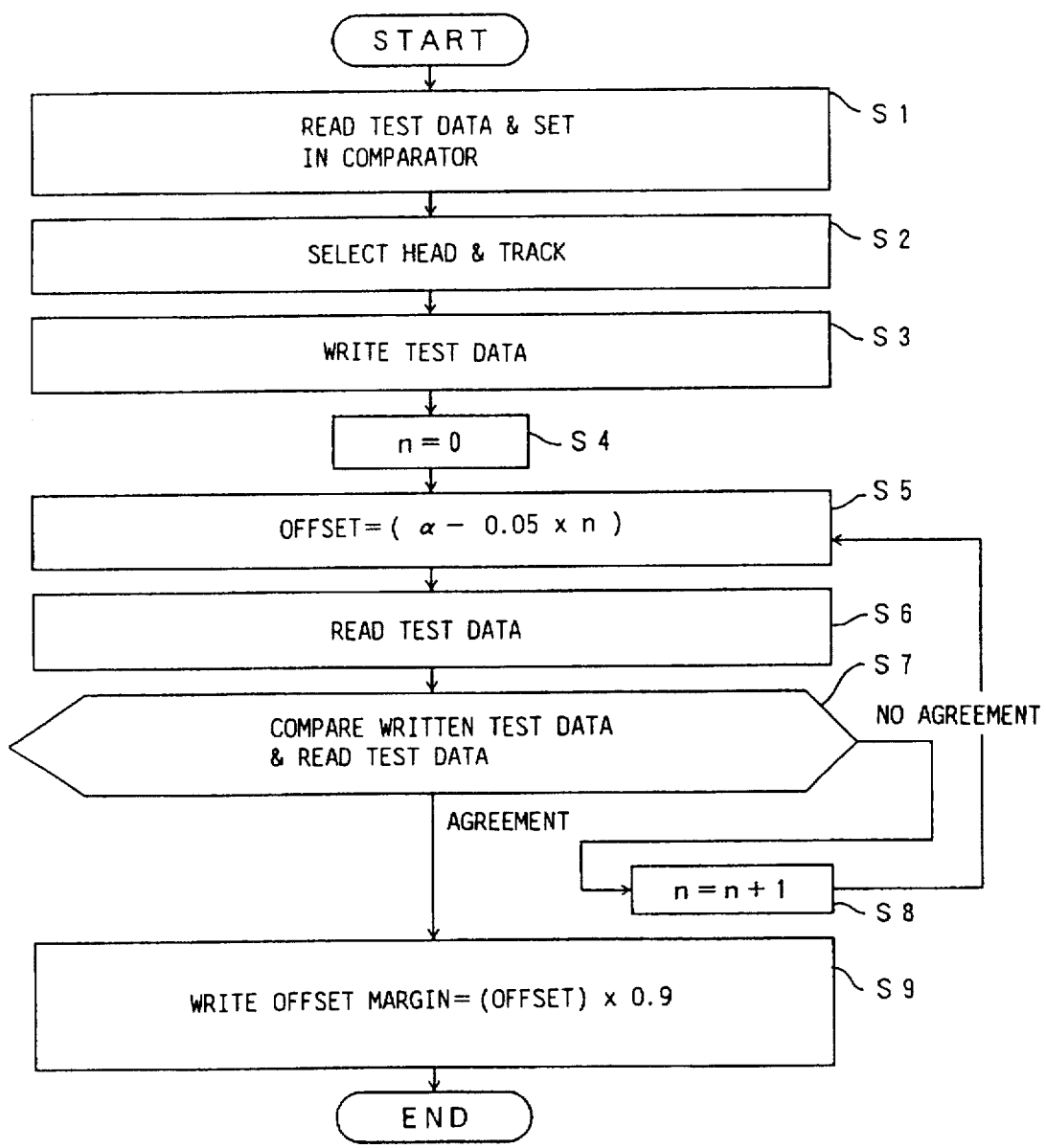
FIG. 4 is a flowchart showing the operation of the circuit of FIG. 3.
Figure 7:
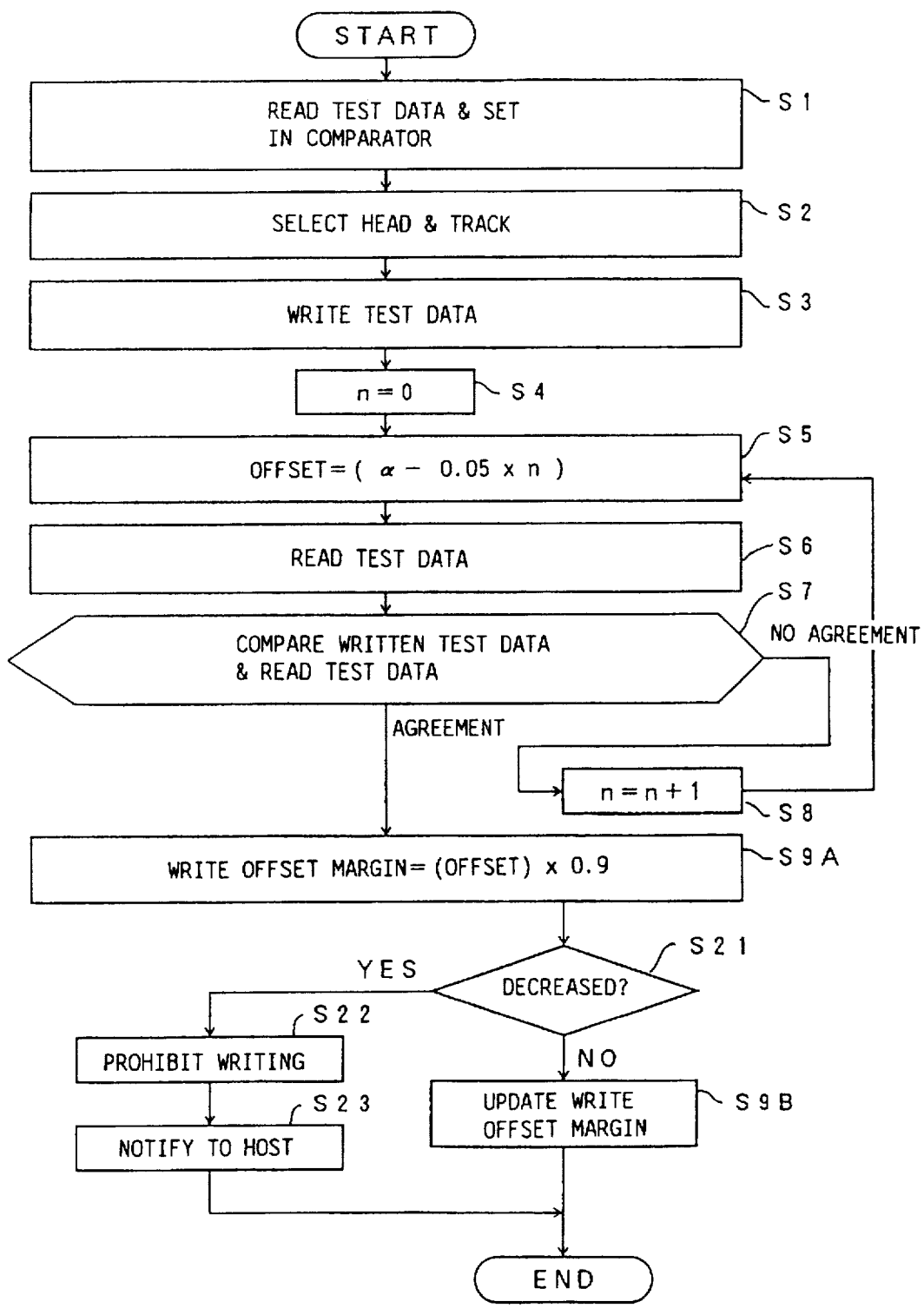
FIG. 7 is a flowchart showing another embodiment of the present invention.

FIG. 7 shows another embodiment of the present invention, wherein it will be noted that the process of FIG. 7 includes the steps S1–S9A identical with the steps S1–S9 of FIG. 4. After the step S9A, a step S9A is carried out wherein a new value of write offset margin is obtained based upon a new maximum off-track tolerance obtained in the steps S1–S9.

After the step S9A, a step S21 is carried out in the process of FIG. 7, wherein it is discriminated whether or not the updated write offset margin is smaller than the former write offset margin obtained previously. If the result is NO, the MPU 62 carries out a step S9B wherein the write offset margin held in the memory 63 is updated by the newly obtained write offset margin.

On the other hand, if the result of the step S21 is YES, indicating a further decrease in the write offset margin for the selected head, the MPU 62 detects an anomaly and prohibits the operation of the head in a step S22. Further, a notification is made to the host device 51 in a step S23 via the hard disk controller 61 and the interface 52 about the anomaly of the head thus detected.

After the step S9B or S23, the setting up of the write offset margin of FIG. 7 is completed.

It should be noted that one may combine the processes of FIG. 6 and FIG. 7.

Further, one may increase the amount of head offset gradually in the steps of S5–S8 of FIG. 4 when determining the maximum off-track tolerance, rather than decreasing the offset.

Further, it should be noted that the foregoing measurement and setting up of the write offset margin for a magnetic head is conducted for each of the tracks on the magnetic disk.

Further, the present invention is by no means limited to the embodiments described heretofore, but various variations and modifications may be made without departing from the scope of the invention.

What is claimed is:

1. A method for setting a write offset margin for each head of a disk drive, the disk drive including a plurality of heads which each write to and read from a plurality of tracks defined by a recording medium, comprising the steps of:

writing test data on said recording medium along at least two selected said tracks from each said plurality of tracks defined thereon, using the head to write;

reading said test data from said recording medium by the head, while changing an offset of the head with respect to said selected tracks;

determining a maximum offset that provides agreement between said test data written into said recording medium along said selected tracks by the head and said test data read out from said recording medium by the head along said selected tracks; and setting a write offset margin for said magnetic disk based upon said maximum offset, wherein said step of setting up said write offset margin is conducted for each said selected track in each said plurality of tracks.

2. A method as claimed in claim 1, wherein said step of setting up said write offset margin includes a step of storing said write offset margin in a memory.

3. A method as claimed in claim 1, wherein said steps of writing said test data, reproducing said test data, determining said maximum offset and setting up said write offset margin are carried out with a predetermined timing.

4. A method as claimed in claim 3, wherein said steps of writing said test data, reproducing said test data, determining said maximum offset and setting up said write offset margin are carried out repeatedly with a predetermined interval.

5. A method as claimed in claim 3, wherein said steps of writing said test data, reproducing said test data, determining said maximum offset and setting up said write offset margin are carried out at a startup of said disk drive.

6. A method as claimed in claim 1, further including a step of disabling said head to write data when said write offset margin has decreased as compared with a write offset margin obtained previously.

7. A method as claimed in claim 6, further including a step of notifying a host device, cooperating with said magnetic disk drive, of disabling of said head.

8. A write offset setup circuit for use in a disk drive that includes a recording disk and a plurality of heads which each write to and read from a plurality of tracks defined by a recording medium, comprising:

a memory for storing test data;

a write circuit for writing said test data into said recording disk by the head along at least two selected tracks from each said plurality of tracks defined on said recording disk;

a reproducing circuit for processing said test data that has been read out from said disk by the head to produce reproduced test data;

an evaluation circuit supplied with said test data from said memory and further with said reproduced test data from said reproducing circuit for identifying a maximum allowable off-track of the head with respect to each said selected track in which an agreement is maintained between said test data and said reproduced test data, said evaluation circuit supplying said maximum allowable off-track to a head drive controller as a predetermined maximum off-track; and a setup unit for writing write offset margin into said memory based upon said maximum off-track, wherein said setup unit writes said write offset margin into said memory for each of said selected tracks of each said plurality of tracks.

9. A write offset setup circuit as claimed in claim 8, further comprising a timer that activates said write circuit, said reproducing circuit, said evaluation circuit and said setup unit, with a predetermined timing.

10. A write offset setup circuit as claimed in claim 9, wherein said timer activates said write circuit, said reproducing circuit, said evaluation circuit and said setup unit at a startup of said disk drive.

11. A write offset setup circuit as claimed in claim 9, wherein said timer activates said write circuit, said reproducing circuit, said evaluation circuit and said setup unit periodically with a predetermined interval.

12. A write offset setup circuit as claimed in claim 8, further including a head disabling circuit that disables an operation of said head when the magnitude of said write offset margin has decreased as compared with a write offset margin obtained previously.

13. A write offset setup circuit as claimed in claim 12, further including a notification circuit for notifying a disabling of operation of said head to a host device that cooperates with said disk drive.

14. A disk drive, comprising:

a disk, defined with a plurality of tracks for storing information signals therealong;

a drive motor for driving said disk;

a plurality of heads supplied with information signals for recording and/or reproducing said information signals to and from said disk along each of said tracks;

a head drive mechanism for carrying said plurality of heads, said head drive mechanism causing said heads to scan said disk along each of said tracks;

a head drive controller for controlling said head drive mechanism such that said heads scan said disk along each of said tracks on said disk within a predetermined maximum off-track;

a recording circuit for supplying test data to each of said heads as information signals for causing each of said heads to record said test data on said disk along each of said tracks;

a memory for storing said test data;

a reproducing circuit for processing information signals reproduced from each of said tracks on said disk by each of said heads;

an evaluation circuit supplied with said test data from said memory and further with said reproduced information signals from said reproducing circuit, for identifying a maximum allowable off-track of each of said heads in which an agreement is achieved between said test data and said reproduced information signal, said evaluation circuit supplying said maximum allowable off-track to said head drive controller as said predetermined maximum off-track for each of said tracks; and a setup unit for writing a write offset margin into said memory based upon said maximum off-track for each of said tracks.

15. A disk drive as claimed in claim 14, wherein said setup unit writes said write offset margin into said memory for each of said tracks.

16. A disk drive as claimed in claim 14, further comprising a timer that activates said recording circuit, said reproducing circuit, said evaluation circuit and said setup unit, with a predetermined timing.

17. A disk drive as claimed in claim 16, wherein said timer activates said recording circuit, said reproducing circuit, said evaluation circuit and said setup unit at a startup of said disk drive.

18. A disk drive as claimed in claim 16, wherein said timer activates said recording circuit, said reproducing circuit, said evaluation circuit and said setup unit periodically with a predetermined interval.

19. A disk drive as claimed in claim 14, further including a head disabling circuit that disables an operation of said head when the magnitude of said write offset margin has decreased as compared with a write offset margin obtained previously.

20. A disk drive as claimed in claim 19, further including a notification circuit for notifying a disabling of operation of said head to a host device that cooperates with said disk drive.

21. A method for setting a write offset margin for each head of a disk drive, said disk drive including a plurality of heads, said method comprising the steps of:

writing test data on a recording medium along a track defined thereon, using the head to write;

reading said test data from said recording medium by the head, while changing an offset of the head with respect to said track;

determining a maximum offset that provides agreement between said test data written into said recording medium along said track by the head and said test data read out from said recording medium by the head along said track; and setting a write offset margin for said magnetic disk based upon said maximum offset, wherein said step of setting up said write offset margin is conducted for each of said tracks on said recording medium.

22. A write offset setup circuit for use in a disk drive that includes a recording disk and a plurality of heads, comprising:

a memory for storing test data;

a write circuit for writing said test data into said recording disk by the head along a track defined on said recording disk;

a reproducing circuit for processing said test data that has been read out from said disk by the head to produce reproduced test data;

an evaluation circuit supplied with said test data from said memory and further with said reproduced test data from said reproducing circuit for identifying a maximum allowable off-track of the head with respect to said track in which an agreement is maintained between said test data and said reproduced test data, said evaluation circuit supplying said maximum allowable off-track to a head drive controller as predetermined maximum off-track; and a setup unit for writing a write offset margin into said memory based upon said maximum allowable off-track, wherein said recording disk has a plurality of tracks, and wherein said setup unit writes said write offset margin into said memory for each of said tracks.

* * * * *